April 3, 1962   W. DE HAAN   3,028,193
TRUCK PLATFORM BED ATTACHMENT
Filed Oct. 15, 1959   4 Sheets-Sheet 1

INVENTOR.
WOLBERT De HAAN
BY
F. J. Loucek
ATTORNEY

April 3, 1962 W. DE HAAN 3,028,193
TRUCK PLATFORM BED ATTACHMENT
Filed Oct. 15, 1959 4 Sheets-Sheet 2
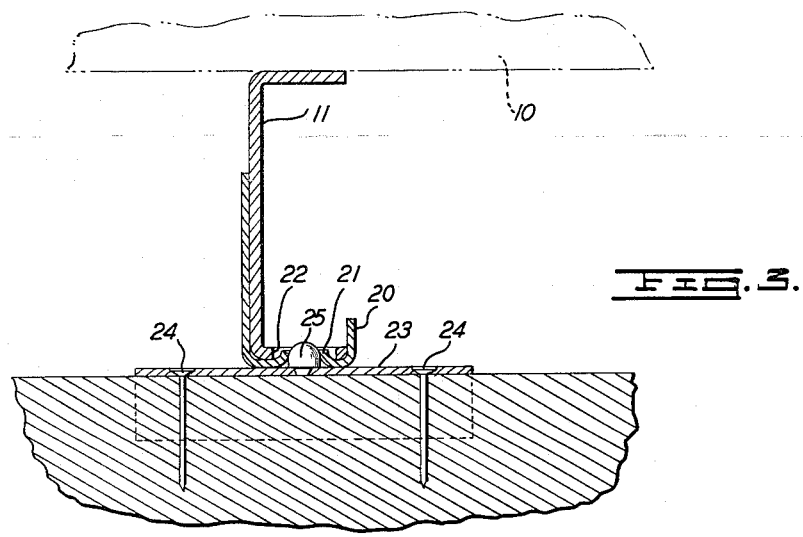
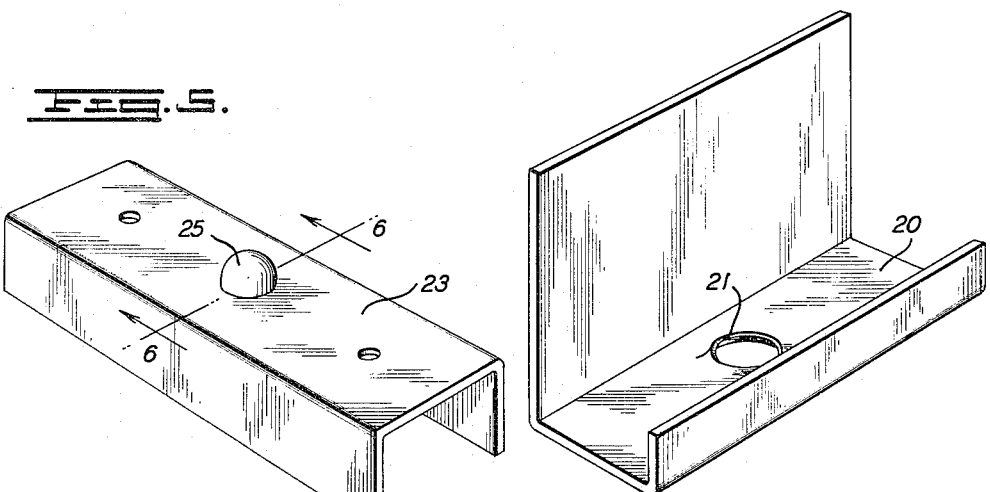
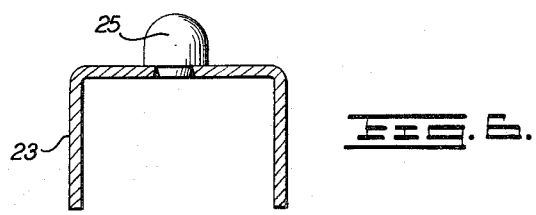
INVENTOR.
WOLBERT De HAAN
BY F. J. Soucek
ATTORNEY

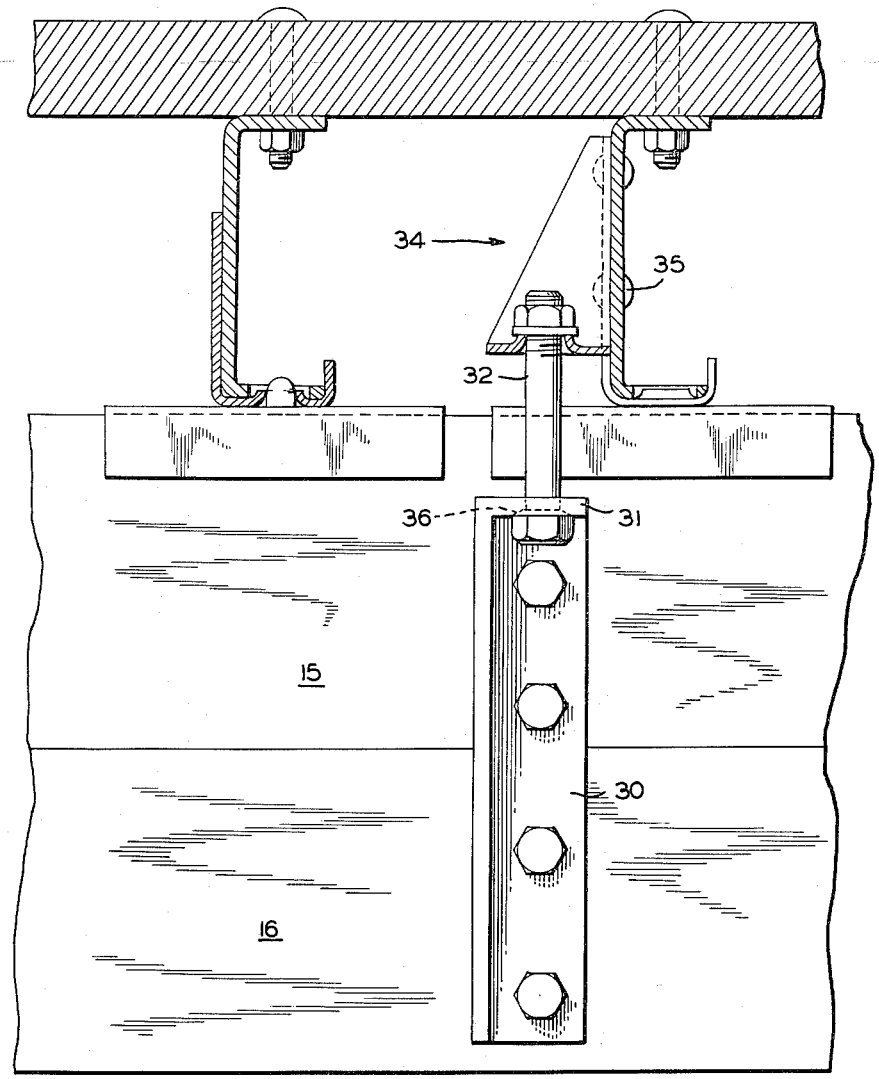

United States Patent Office 3,028,193
Patented Apr. 3, 1962

3,028,193
TRUCK PLATFORM BED ATTACHMENT
Wolbert De Haan, Farmington, Mich., assignor to General Motors Corporation, Detroit, Mich., a corporation of Delaware
Filed Oct. 15, 1959, Ser. No. 846,694
5 Claims. (Cl. 296—35)

This invention relates generally to means for mounting motor vehicle bodies upon a vehicle frame, and more particularly to means for anchoring a truck platform bed to a truck frame.

It has been conventional practice to retain platforms on truck frames by means of long tie bolts. In previous truck mountings, frequent tie bolt failures have been experienced as the result of compound loads. Although the bolts are principally effective to carry tension loads, they have been often subjected to bending and shear loads due to horizontal shifting of the body with respect to the frame. The present mounting arrangement is intended to overcome this difficulty by providing supplementary load carrying members. By use of this invention, shear support is accomplished by means other than the tie bolts, and the bolts are thereby limited to tension loading. Furthermore, the structure is readily adaptable for use with various body styles.

The objects of this invention are: To provide means for limiting bolt loads to essentially pure tension; to provide means for cooperation with the bolts to carry lateral and transverse shear loads; and to arrange the mounting of a truck platform bed in such a way that different simple elements function separately (1) to hold down the platform or other body member and (2) to prevent its shifting laterally or transversely of the frame.

The above objects are attained in accordance with the present invention by constructing the mounting arrangement in two parts or sub-units. The first comprises a frame-side sill unit, and the second, a platform-cross sill unit. The frame-side sill unit consists of two side sills clamped upon the side rail members of the frame. By means of the platform-cross sill unit, the truck platform bed is rigidly attached to several cross sill members. At assembly, the attaching structure which comprises the invention is utilized to retain the platform-cross sill unit upon the frame-side sill unit which serves as a base. This attaching structure includes two separate means, one a socket and locating button, arranged to prevent horizontal slippage between the two units; and the other, e.g. a bolt, serving to hold down the first unit upon the second. Thus, the latter means may be simply a tension member since shear loads are borne by the socket and button means.

In describing the mounting arrangement reference will be made to the drawings, in which like numbers refer to like parts and wherein:

FIGURE 3 is an enlarged sectional view taken along the lines 3—3 of FIG. 2;

FIGURE 4 is a perspective view of the cross sill reinforcing bracket employed in the present invention;

FIGURE 5 is a perspective view of the side sill cap assembly of the present invention;

FIGURE 6 is a sectional view taken along the lines 6—6 of FIG. 5;

FIGURE 8 is similar to FIGURE 7, but shows a second modification of the frame-side sill attaching means.

Figure 1:
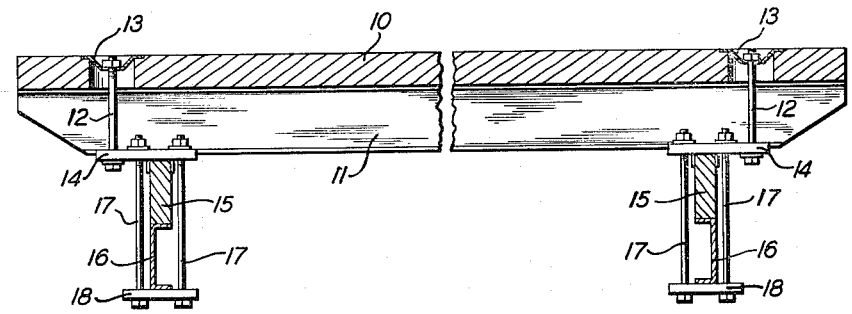
FIGURE 1 is an end view partly in section, showing the transverse supports for a platform bed in accordance with the present invention.
Figure 2:
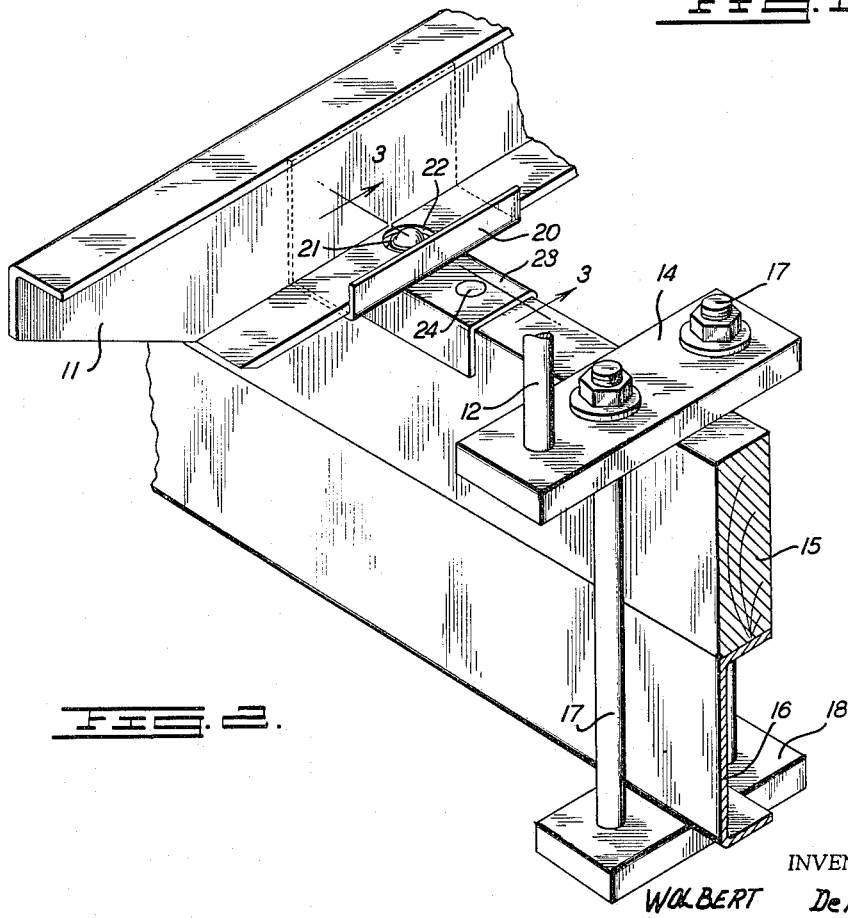
FIGURE 2 is an assembly perspective view of the connection which comprises the present invention.

Considering first the frame-side sill unit reference is made to FIGURE 1. A side sill 15 is supported upon a side rail member 16 of a truck frame. These parts are held in assembled relationship by a clamping device consisting of a lower plate member 18 and an upper plate member 14. The plates have clearance holes to receive bolts 17 which straddle the side sill. A pair of side sills is used as shown, and FIGURE 2 is an enlarged view of the connection of one of these to the frame.

Figure 7:
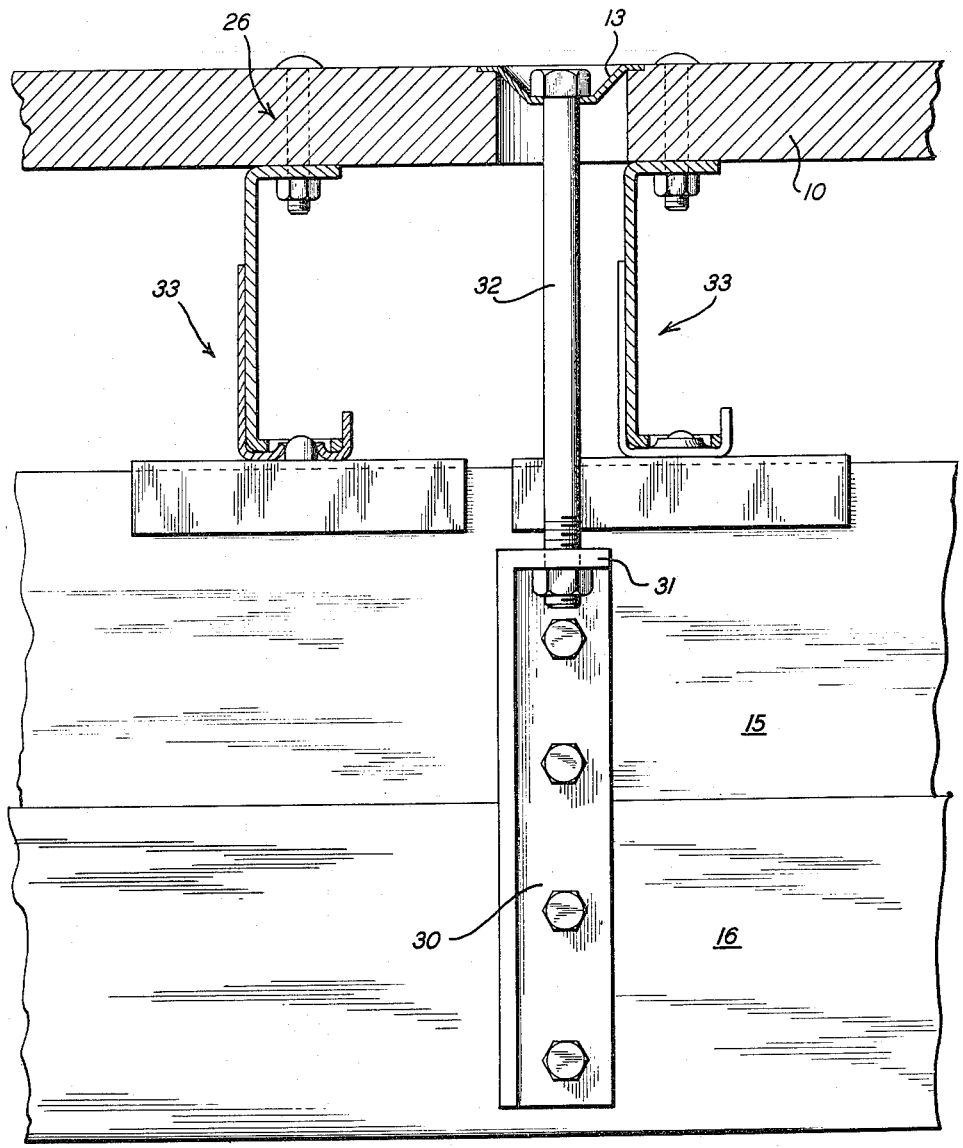
FIGURE 7 is an elevational view partly in section of a modification of the frame-side sill attaching means, in accordance with the present invention.

The second sub-unit is formed by attaching the cross sills 11 to the platform bed 10, as by stove bolts 26 (FIGURE 7). The platform-cross sill unit formed thereby is supported on the side sills and held down by the platform bolts 12. In the modification of FIGURES 1 and 2, each bolt 12 connects a lateral extension of the upper plate 14 with a recessed washer 13 carried by the platform bed. The purpose of washer 13 is to countersink the tie bolt heads or nuts below the top surface of the platform, in order to provide a flat and completely obstruction-free load surface.

The means for interrelating the two sub-units discussed above can be seen by reference to FIGURES 2-6. In order to reduce the shear and bending loads upon the platform tie bolts, additional structure is provided between the side sill 15 and the cross sill 11. A side sill cap assembly, shown in FIGURE 5, is arranged to fit over the side sill. The assembly may be attached to the side sill in any conventional manner, as by nails 24. The essential functional portion of this assembly is a locating button 25 which protrudes upwardly from the top surface of the cap 23. The button 25 may be preformed and welded to the cap 23, as shown, or may be formed by indenting the top surface of the cap from beneath to provide an upstanding protuberance. As more clearly shown in FIGURE 6 the button 25 preferably has substantially vertical side walls merging into a rounded top.

For cooperation with this cap assembly there is provided a cross sill reinforcing bracket 20, detailed in FIGURE 4. A flared flange socket 21 is formed in the lower leg of the generally L-shaped bracket and is adapted to receive the button 25. As shown, the socket 21 may be provided by a partial drawing operation. Alternately, it may be formed by attaching a separate collar piece to the bracket 20, as by welding or other suitable means. The reinforcing bracket is attached to the cross sill by appropriate means such as spot welding, and the raised flange 21 is aligned with a clearance bore 22 in the lower leg of the channel-shaped cross sill. Upon assembly of the sub-units, the protuberance or button 25 of the cap assembly is received in the socket or receptacle portion 21 of the bracket, with the edges of the socket engaging the vertical side walls of the button.

The effect of this interlocking cooperation is to restrict horizontal movement, either laterally or transversely, between the side sill and the cross sill members. This greatly reduces the shear load placed upon the platform tie bolts, which may thus be designed more economically as pure tension members. Furthermore, this method of attachment not only avoids compound bolt loads, but also reduces the normal "play" between the sill members, thus preventing appreciable shifting of the truck platform with respect to the frame and thereby reducing the wear between the sill members. An additional benefit is the reduction of noise due to the rubbing action of previous arrangements.

A plurality of cross sills may be arranged along the transverse dimension of the platform as is indicated in FIGURE 7, each being attached to the side sill by a joint 33 such as that described.

FIGURE 7 also shows an alternate method for construction of the frame-side sill unit, in which the side sill is connected to the frame by means of a bracket 30 bolted on the face of both members 15 and 16. This bracket incorporates a flange 31 to which may be anchored the platform bolt 32. The bolt, like bolt 12 of FIGURE 1, performs the function of retaining the platform-cross sill unit on the frame side sill base. The cap assembly-cross sill cooperation shown at 33 is similar to that of FIGURE 3, already discussed.

FIGURE 8 shows another modification of the frame-side sill connection. An auxiliary support 34 is mounted upon the cross sill by any convenient means such as rivets 35. Platform bolt 32 then interconnects bracket 30 and the support 34. This makes possible the use of much shorter bolts since they need not span the full distance from bracket to platform. In addition, as shown, a spherical seat 36 may be provided in flange 31 for cooperation with a contoured bolt head, in order to provide freedom of movement for correcting misalignment and to avoid bending stress in the bolts.

There has thus been provided an effective means for overcoming platform tie bolt failures, by utilizing supplementary shear-carrying members. This arrangement is readily adapted for use with various bodies to be attached to a truck frame. While providing secure retention of the platform upon the frame, the individual sub-units enables convenient detachment of the body member.

I claim:

1. In a truck platform attaching device, the combination of a frame-side sill unit including a truck frame, a pair of side sills and fastening means for joining said side sills to said frame; a platform-cross sill unit having a truck platform and a plurality of cross sill members; plate members mounted on said side sills remote from the locations of overlap of said side sills and said cross sill members, tie bolts anchored in said plate members for retaining said platform-cross sill unit upon said frame-side sill unit; and paired, cooperating members interposed between said units at the locations of overlap of said side sills and said cross sill members, one of said members including a locating button rigidly mounted thereon and the other of said members having a flared socket receiving said locating button, whereby horizontal movement between said units is limited and the load on said tie bolts is effectively restricted to tension.

2. In a mounting arrangement for truck platforms, the combination of a truck frame; a side sill attached to said frame; a platform-cross sill overlying said side sill, and provided with a clearance bore in the region where it crosses said side sill; a truck platform attached to said cross sill to form a platform-cross sill unit; a cap member mounted upon said side sill and located between it and said cross sill; a locating button rigidly mounted on said cap member; a reinforcing bracket carried by said cross sill and having an upstanding flared flange in alignment with said clearance bore, said flange being adapted to receive said locating button; a plate member on said side sill remotely positioned with respect to said cap member and reinforcing bracket, and fastening means anchored in said plate member and acting to retain said platform-cross sill unit upon said side sill, the interaction of said button and said flange serving to carry shear loads and therefore limiting said fastening means to axial loading.

3. In a mounting arrangement for truck platforms, the combination of a truck frame; a side sill supported by said frame; fastening means to interconnect said side sill and said frame; a platform cross sill overlying said side sill, and provided with a clearance bore in the region where it crosses said side sill; a truck platform supported upon said cross sill; a cap member attached to said side sill and located between it and said cross sill, said cap member providing an upstanding locating button rigidly mounted thereon; a reinforcing bracket fastened to said cross sill and having an upstanding flared flange in alignment with said clearance bore, said flange being adapted to receive said locating button to prevent lateral or transverse relative movement between said cross sill and said side sill; and tie bolts, a plate member mounted on said side sill remotely positioned with respect to said cap member and reinforcing bracket, anchored in said plate member and acting to retain said platform, said cross sill and said side sill in assembled relation, the interaction of said button and said flange serving to carry most of the shear load and thereby to limit said tie bolts to essentially axial loading.

4. In a truck platform attachment, the combination of a truck frame; a side sill supported by said frame; a lower plate beneath said frame and an upper plate above said side sill, each plate being adapted to receive tie bolts, and said upper plate having a lateral extension outwardly of said side sill; tie bolts acting between said upper and lower plates and straddling said side sill whereby said side sill is rigidly clamped to said frame; a platform-cross sill crossing said side sill and provided with a clearance bore in the region of overlap; a cap member attached to said side sill and located between it and said cross sill; a locating button upstanding from said cap member and rigidly attached thereto; a reinforcing bracket carried by said cross sill; a receptacle-like element formed upon said backet, aligned with said clearance bore and adapted to receive said locating button to prevent slip between said cross sill and said side sill; a truck platform supported upon said cross sill; recessed washers carried by said platform; and fastening means extending between said washers and said upper plate extension whereby said platform, said cross sill and said side sill are held together, said fastening means being loaded principally in tension, and the cooperation between said buton and said flange providing the necessary shear support.

5. In a mounting arrangement for truck platforms, the combination of a truck frame; a side sill supported by said frame; fastening means comprising a bracket to interconnect said side sill and said frame; a platform cross sill overlying said side sill, and provided with a clearance bore in the region where it crosses said side sill, an auxiliary support mounted upon said cross sill; a truck platform supported upon said cross sill; a cap member attached to said side sill and located between it and said cross sill, said cap member providing an upstanding locating button, a reinforcing bracket fastened to said cross sill and having an upstanding flared flange in alignment with said clearance bore, said flange being adapted to receive said locating button to prevent lateral or transverse relative movement between said cross sill and said side sill; and tie bolts between said bracket and said auxiliary support acting to retain said platform, said cross sill and said side sill in assembled relation, the interaction of said button and said flange serving to carry most of the shear load and thereby to limit said tie bolt to essentially axial loading.

References Cited in the file of this patent

UNITED STATES PATENTS

| 543,663 | Wenzelmann | July 30, 1895 |
| 774,861 | Wenzelmann | Nov. 15, 1904 |
| 1,861,487 | Yeoman | June 7, 1932 |
| 1,867,806 | Brownell | July 19, 1932 |